Oct. 27, 1925.

E. G. GARTIN 1,558,802

PNEUMATIC TOOL

Filed May 26, 1919   2 Sheets-Sheet 1

Inventor:
Elmer G. Gartin
by
atty.

Oct. 27, 1925.

E. G. GARTIN 1,558,802

PNEUMATIC TOOL

Filed May 26, 1919

Inventor:
Elmer G. Gartin
by
Atty

Patented Oct. 27, 1925.

1,558,802

UNITED STATES PATENT OFFICE.

ELMER GEORGE GARTIN, OF CLAREMONT, NEW HAMPSHIRE, ASSIGNOR TO SULLIVAN MACHINERY COMPANY, A CORPORATION OF MASSACHUSETTS.

PNEUMATIC TOOL.

Application filed May 26, 1919. Serial No. 299,704.

*To all whom it may concern:*

Be it known that I, ELMER G. GARTIN, a citizen of the United States, residing at Claremont, in the county of Sullivan and State of New Hampshire, have invented certain new and useful Improvements in Pneumatic Tools, of which the following is a full, clear, and exact specification.

This invention relates to pneumatic tools. One object of the present invention is to provide an improved pneumatic tool. Another object of the present invention is to provide an improved exhaust controlling means for controlling the time of exhaust of the operating fluid from a cylinder of the tool. Still another object of the present invention is to provide an improved drilling apparatus wherein a pneumatic tool, a tool feeding means, and exhaust controlling means are combined to form a simple and compact structure. These and other objects and advantages of my improved construction will, however, hereinafter more fully appear.

In the accompanying drawings, I have shown for purposes of illustration several embodiments which my invention may assume in practice.

In these drawings.

Figure 1:
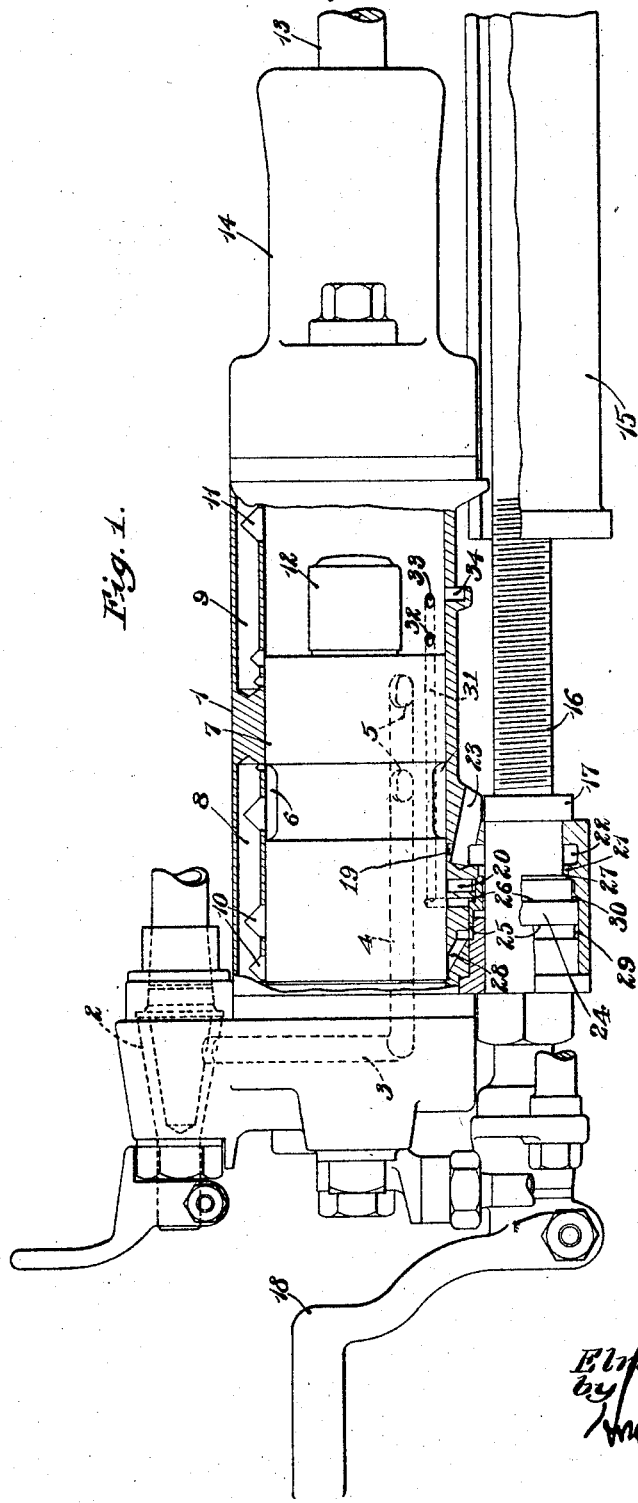
Fig. 1 is a view, part in side elevation and part in longitudinal section of one embodiment of my improved drilling apparatus.

In Fig. 1 which illustrates one form of my invention, I have shown a pneumatic tool having a cylinder 1 to which compresed air or other pressure fluid is conducted from a controlling valve 2 and passageways 3 and 4 to ports 5 from which the compressed fluid is directed alternately to the ends of the cylinder by a recess 6 spooled out of the piston 7, and bypasses 8 and 9, to ports 10 and 11 opening into the cylinder adjacent the rear and front ends thereof respectively. As the piston 7 reciprocates in the cylinder 1, a striking head 12 carried thereby delivers a blow to the shank end of a drill steel 13 carried by a suitable chuck 14 mounted on the forward end of the cylinder. As the material to be removed is cut away by the bit end of the drill steel 13, the pneumatic tool is fed forward toward the work on a cradle 15 by a feed screw 16 which passes through a non-rotative nut 17 carried by the cylinder 1, the feed screw 16, in the form shown herein, being rotated manually by a handle 18.

In order that the tool may operate at its highest efficiency by utilizing to the greatest degree possible the pressure fluid admitted to the opposite ends of the cylinder 1 to reciprocate the piston, I preferably use an exhaust controlling means to control the exhaust flow from one end of the cylinder to prevent the opening of the exhaust port in this end until substantially all the expansive force of the pressure fluid has been utilized. In this form of my invention, I provide an exhaust port 19 which is preferably controlled by the piston, and a second exhaust port 20 formed in the cylinder near the rear end thereof. The flow from this second exhaust port through annular passages 21, 22 to a forwardly extending exhaust passage 23 is preferably controlled by a valve having pressure receiving surfaces 25, 26 which may be alternately subjected to the action of a pressure fluid to throw the valve in one direction or the other to open the exhaust port 20 or to close the same by forcing the valve 24 against the valve seat 27. Pressure fluid which acts on the surface 25 preferably flows from the rear end of the cylinder 1 through a passageway 28 to an annular chamber 29 in which a part of the valve 24 reciprocates. The pressure fluid which acts against the opposite pressure receiving surface 26 is preferably admitted to an annular chamber 30 adjacent thereto by a passageway 31 formed in the wall of the cylinder and preferably extending to a point adjacent the front end thereof. As the piston 7 moves rearwardly in the cylinder 1, pressure fluid is admitted from the port 5 through the recess 6, and bypass 8 to the rear end of the cylinder and therefrom through the passageway 28 to the annular chamber 29 where it acts on the surface 25 and the valve 24 forcing the latter toward its seat and holding it there during the greater part of the forward movement of the piston. When the piston is moved far enough forward to permit the recess 6 to place one of the ports 5 in communication with a port 32 opening into the tube or passageway 31, a flow of live pressure fluid will be conducted to the pressure receiving surface 26 of the valve 24 and, because the pressure on the opposite face 25 is at a minimum due to the expansion of the pressure fluid previously admitted to the rear end of the cylinder 1, the valve 24 will be thrown rearwardly to permit an exhausting of pressure fluid from the rear end of the cylinder through the exhaust port 20 to the atmosphere. As the piston starts rearwardly again, a second port 33 opening from the passageway 31 into the cylinder is first uncovered, and the pressure fluid which acts on the surface 26 of the valve is exhausted to the front end of the cylinder and therefrom to the atmosphere through an exhaust port 34 which exhausts the pressure fluid which has driven the piston rearwardly. The exhaust valve 24 is preferably formed hollow in order that it may encircle the non-rotative nut 17 and slide relative thereto, and the passageways 21 and 22, 29 and 30 are formed as annular recesses surrounding this nut in order that the exhaust valve may be structurally combined with the nut 17 and thereby save the necessity of casting with the cylinder 1 a special boss or lug to receive the exhaust valve and the passages communicating therewith.

It should also be noted that by the use of a hollow valve that this member is made very light and may be operated very rapidly to permit a rapid operation of the piston 7 in the pneumatic tool. It should also be observed that the placing of the exhaust valve around the nut 17 saves the use of a heavier tool which would otherwise have to carry an extra boss to contain the valve, and saves extra machine work which would have to be performed on the part of the cylinder which receives the valve and that part which receives the feeding nut.

Figure 2:
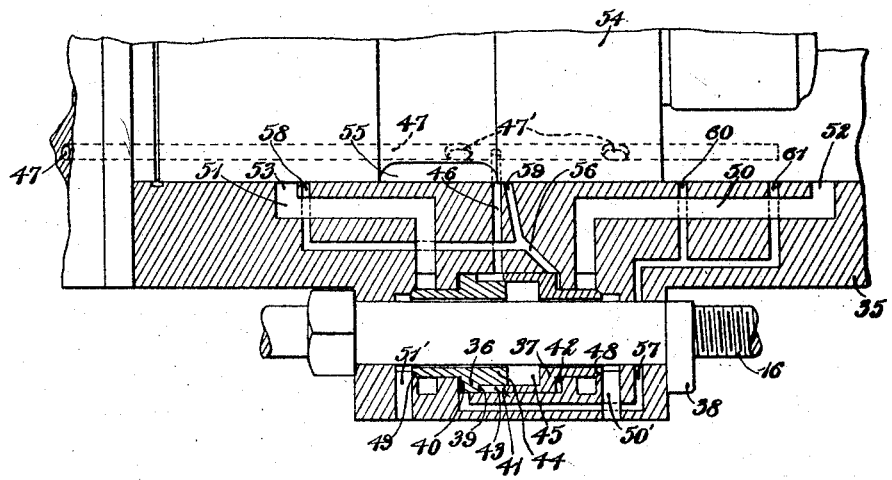
Fig. 2 is a detail longitudinal sectional view of a modified form of drilling apparatus, the ports and passages being shown diagrammatically.

In the form of my invention illustrated in Fig. 2, I have shown an exhaust controlling means for controlling the exhausting of spent pressure fluid from the two ends of the cylinder 35 of a pneumatic tool, and I preferably provide for this purpose a plurality of valves 36, 37 herein shown as mounted concentrically with a non-rotative feed nut 38. Each of the valves 36, 37 is preferably provided with differential pressure receiving surfaces, the valve 36 having a small annular surface 39 and the larger annular surface 40, and the valve 37 having corresponding small and large surfaces 41 and 42, the surfaces 39 and 41 of the two valves being preferably oppositely disposed to form an annular recess 43 around a projecting collar 44 which is received in a socket 45 in the other valve. This annular recess 43 is, in the form shown, in constant communication as through a passageway 46 with a constant pressure inlet 47 similar to the inlet 4 shown in Fig. 1. The pressure fluid admitted through the conduit 46 is normally operative to separate these differential valves and force them against opposite seats 48, 49 to close exhaust passageways 50 and 51 leading from ports 52 and 53 in the forward and rear ends of the cylinder respectively.

As the piston 54 is reciprocated in the cylinder under the influence of pressure fluid admitted alternately to the opposite ends of the cylinder, the exhaust passageways 50 and 51 will be alternately opened and closed in such a relationship to the movement of the piston that as the piston is moving in one direction or the other under the expansive force of the fluid pressure in that end, the corresponding exhaust passage will be held closed until practically the limit of expansion of the compressed air has been reached. During the exhausting of spent pressure fluid, the exhaust passages will be held open until the piston has covered an appreciable distance in its return movement so that a relatively large quantity of exhaust fluid will be exhausted to the atmosphere. In order that the operation of the valves may be positive and may be timed according to the rate of movement of the piston and expansion desired, I preferably control these valves by live pressure fluid which is admitted to the larger differential surfaces of the valves from the inlet ports 47' in the inlet passage 47 by an annular recess 55 preferably formed in the piston and suitable passageways 56 and 57, the former conducting pressure fluid to the larger surface 42 of the valve 37 and the latter conducting pressure fluid to the larger surface 40 of the valve 36. These passageways preferably communicate with the cylinder through a plurality of ports 58, 59, 60 and 61, the ports 59 and 60 serving as inlet ports to the passageways 56 and 57 respectively, and the ports 58 and 61 serving as exhaust ports for these passageways respectively.

When the piston moves forward, pressure fluid acting on the rear head thereof expands and exerts its expansive force on the piston head until the piston has practically reached the forward end of its stroke, when the recess 55 places one of the ports 47' in communication with the inlet port 60 of the passageway 57, the other port 61 leading into this passageway being closed by the front piston head. Live pressure fluid will flow from the passageway 47 through the recess 55 and passageway 57 to the pressure surface 40 of the valve 36 throwing this valve away from its seat 49 against the pressure of the live pressure fluid acting on the surface 49 and permitting an exhaust from the rear end of the cylinder through the passageways 51, 51'. As the piston starts its rearward movement, the exhaust port 61 is first uncovered permitting exhausting of the pressure fluid from the passageway 57 and allowing the compressed air acting on the smaller surface 39 to force the exhaust valve 36 to its seat and close communication between the rear end of the cylinder and the atmosphere. It should be noted that by this improved construction that the exhaust port 53 may be placed at any point desired in the rear part of the cylinder and that any control desired of a flow of exhaust fluid through the passageway 51 may be obtained by changing the relative positions of the ports 60 and 61 with respect to the cylinder. As the piston moves in a rearward direction, the exhaust passageway 50 is controlled in substantially the same manner as the exhaust passageway 51, the inlet port 59 being placed in communication with one of the ports 47' of the live pressure fluid inlet 47 to throw the valve 37 and thus place the exhaust passageway 50 in communication with the exhaust with the corresponding outlet 50'. The port 58 functions in the same manner with respect to the passageway 56 as the port 61 does to the passageway 50, exhausting the pressure fluid from the passageway 56 and permitting the live pressure fluid acting on the surface 41 to close the valve 37.

It will thus be seen that I have provided an improved valve mechanism for controlling the flow of exhaust from either end of the cylinder of a pneumatic tool and that I have so placed the valve controlling exhaust and inlet passageways of the valve mechanism that the ends of the cylinders can be exhausted at any point desired and that they can be closed from communication to the atmosphere during as long a period as desired when the pressure fluid is expanding and driving the piston in one direction or the other. It will further be seen that the passageways for conducting the exhaust fluid to the atmosphere may be connected with the cylinder at any points throughout the length thereof as desired. While I have shown this valve mechanism as placed coaxially with the non-rotative feed nut, the valve mechanism may be if desired placed otherwise in the cylinder casing, and while I have shown the feed nut as located substantially centrally of the cylinder of the pneumatic tool, it is to be understood that if desired this feed nut may be placed adjacent the forward or rear ends of the cylinder.

Figure 3:
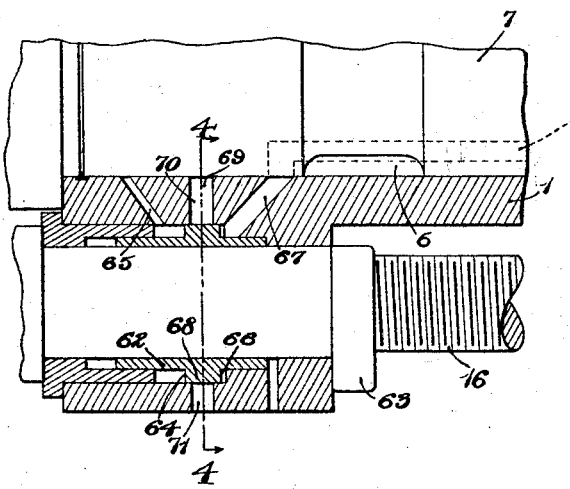
Fig. 3 is a partial longitudinal sectional view of another form of my invention.
Figure 4:
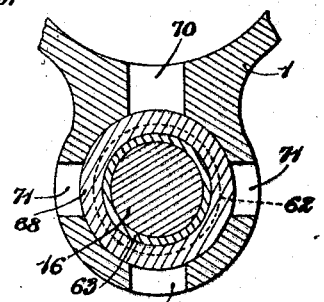
Fig. 4 is a transverse sectional view thereof substantially on the line 4—4 Fig. 3.

In the modified form of my invention showing Figs. 3, 4, I have provided a very simple and efficient valve mechanism for exhaust pressure fluid from but one end of a cylinder and have shown for this purpose a cylindrical valve 62 herein shown as mounted coaxially with a feed nut 63, the movement of the valve to closed position being controlled by a rise of pressure fluid in the rear end of the cylinder which communicates with a surface 64 on the left hand side of the valve (see Fig. 3) through a passageway 65, the valve being thrown in a rearward direction by a rise in pressure fluid in the front end of the cylinder which communicates with a pressure receiving surface 66 of the valve 64 through a passageway 67, it being understood that due to the alternate expanding and exhausting of the pressure fluids at the ends of the cylinders that when the pressure rises in one of the passageways 65, 67 the pressure in the other decreases. The valve flange 68 whose sides are formed by the pressure receiving surfaces 64, 66 controls the flow of exhaust fluid from a port 69 through a short passageway 70 which communicates with a plurality of preferably radially disposed passageways 71 when the valve 62 is in its rear position. The passageways 65, 67 may communicate at any point desired with the forward or rear end of the cylinder and the port 69 may also communicate with a cylinder at any point desired, thus giving the control of the exhaust that cooperates best with the speed of reciprocation of the piston.

It will thus be seen that in my improved pneumatic tool I have provided an improved means for controlling the operation of a piston by controlling the exhausting of pressure fluid so as to give a high degree of expansion of the pressure fluid in the ends of the cylinder, and that by this improved means the control may be varied as desired to give the best cooperation between the expansion of the pressure fluid, the exhausting of the same, and the speed of reciprocation of the piston. It will also be seen that the pneumatic tool, exhaust control means and the tool feeding means have been so combined as to form a simple, compact and light structure which is very easily assembled, and cheaply manufactured.

While I have in this application specifically described several embodiments which my invention may assume in practice, it is to be understood that these forms are shown for illustrative purposes only and that the invention may be modified and embodied in other forms without departing from its spirit or the scope of the appended claims.

What I claim as new and desire to secure by Letters Patent is:

1. In a drilling apparatus, a tool, means for moving said tool comprising a member carried by said tool, and having its axis laterally disposed from the tool axis, and a cooperating member adjustable relatively thereto, and means for controlling the operation of said tool including means carried by one of said members and coaxially arranged with respect to the other thereof.

2. In a drilling apparatus, a tool, means for moving said tool comprising a member carried by said tool, and having its axis laterally disposed from the tool axis, and a cooperating member adjustable relatively thereto, and means for controlling the operation of said tool including means carried by said first named member and coaxially arranged with respect to the other member.

3. In a drilling apparatus, a tool, means for moving said tool and comprising a member carried by said tool, and a cooperating member adjustable relatively thereto, and means for controlling the operation of said tool including means surrounding said first named member and coaxially arranged with respect to the other member.

4. In a drilling apparatus, a tool, feeding means for said tool comprising a member carried by said tool and adapted to move therewith, a member cooperating with said first mentioned member, but fixed as regards motion of translation, and means operative to control said tool including means surrounding said last mentioned member.

5. In a drilling apparatus, a percussive tool, feeding means for said tool comprising a member carried by and disposed at one side of said tool and adapted to move therewith, a member cooperating with said first mentioned member, but fixed as regards motion of translation, and means operative to control said tool including means coaxial with said last mentioned member.

6. In a drilling apparatus, a fluid pressure operated motor, feeding means for said motor comprising a member carried by said motor and adapted to move therewith, a member cooperating with and extending through said first mentioned member but fixed as regards motion of translation, and means operative to control said motor including means coaxial with said last mentioned member.

7. In a drilling apparatus, a tool, feeding means for said tool comprising a member carried by said tool and adapted to move therewith, a member cooperating with and extending through said first mentioned member but fixed as regards motion of translation, and means cooperating in the fluid distribution of said tool including means coaxial with said last mentioned member.

8. In a drilling apparatus, a tool, feeding means for said tool comprising a rotatable member, and means cooperating in the fluid distribution in said tool including means surrounding said rotatable member.

9. In a drilling apparatus, a tool, manual feeding means for said tool comprising a rotatable member having its axis disposed to one side of the axis of said tool, and means cooperating in the fluid distribution in said tool including means coaxially arranged with said member.

10. In a drilling apparatus, a pneumatic tool, means for moving said tool and comprising a member carried by and to one side of the axis of said tool, and a cooperating member adjustable relatively thereto, and means for controlling the exhaust of said tool carried by said first named member.

11. In a drilling apparatus, a pneumatic tool, means for moving said tool and comprising a member carried by said tool, and a cooperating member adjustable relatively thereto, and means for controlling the exhaust of said tool for controlling the operation of the same, said means surrounding said first named member.

12. In a drilling apparatus, a tool, a cradle on which said tool is mounted for movement toward or from the work, means comprising cooperating members carried by the tool and cradle for moving said tool on the cradle, and tool controlling means surrounding one of said members.

13. In a drilling apparatus, a tool, a cradle on which said tool is mounted for movement toward or from the work, means comprising cooperating members carried by the tool and cradle for moving said tool on the cradle, and tool controlling means carried by the member surrounding the tool.

14. In a drilling apparatus, a tool, a cradle on which said tool is mounted for movement toward or from the work, means comprising cooperating members carried by the tool and cradle for moving said tool on the cradle, and tool controlling means having its axis disposed to one side of the axis of said tool and carried in the member carried by the tool and coaxially arranged with the member carried by the cradle.

15. In a drilling apparatus, a pneumatic tool, a cradle on which said tool is mounted for movement toward or from the work, means comprising a non-rotating nut carried by the tool and a feed screw carried by the cradle for moving the tool on the cradle, and exhaust controlling means carried by said nut.

16. In a drilling apparatus, a pneumatic tool, a cradle on which said tool is mounted for movement toward or from the work, means comprising a non-rotating nut carried by the tool and a feed screw carried by the cradle for moving the tool on the cradle, and exhaust controlling means carried by said nut and mounted coaxially with said feed screw.

17. In a drilling apparatus, a pneumatic tool, a cradle on which said tool is mounted for movement toward or from the work, means comprising a non-rotating nut carried by the tool and a feed screw carried by the cradle for moving the tool on the cradle, an exhaust controlling valve carried by said nut, and cooperating passages in said nut communicating with the pneumatic tool.

18. In a drilling apparatus, a pneumatic tool having a cylinder, means comprising a member carried by the tool and a cooperating member disposed therein and adjustable relatively thereto for moving the tool, and means carried by said first named member for controlling exhaust flow from both ends of said cylinder.

19. In a drilling apparatus, a pneumatic tool having a cylinder, means comprising a non-rotating nut carried by the cylinder for feeding the tool toward the work, and means mounted coaxially with said nut for controlling exhaust flow from both ends of said cylinder.

20. In a drilling apparatus, a pneumatic tool having a cylinder, means comprising a non-rotating nut carried by the cylinder for feeding the tool toward the work, and means comprising a plurality of valves mounted coaxially with said nut for controlling exhaust flow from both ends of said cylinder.

21. In a drilling apparatus, a pneumatic tool having a cylinder, means comprising a non-rotating nut carried by the cylinder for feeding the tool toward the work, and means mounted coaxially with said nut for controlling exhaust flow from both ends of said cylinder, said controlling means comprising a plurality of oppositely disposed valves each having differential pressure receiving surfaces, one of which is subjected to substantially constant pressure to hold the valve in closing position.

22. An exhaust controlling device for pneumatic tools consisting of a plurality of fluid actuated valves one of which has differential pressure receiving surfaces, means for subjecting one of said surfaces to a substantially constant pressure, and means for varying the pressure on another of said differential surfaces.

23. An exhaust controlling device for pneumatic piston operating tools consisting of a plurality of fluid actuated valves one of which has differential pressure receiving surfaces, means for subjecting one of said surfaces to a substantially constant pressure, and piston controlled means for varying the pressure on another of said differential surfaces.

24. An exhaust controlling device for pneumatic tools comprising a plurality of telescopically arranged fluid actuated valves one of which has differential pressure receiving surfaces, means for subjecting one of said surfaces to a substantially constant pressure, and means for varying the pressure on another of said differential surfaces.

25. An exhaust controlling device for pneumatic piston operating tools comprising a plurality of telescopically arranged fluid actuated valves one of which has differential pressure receiving surfaces, means for subjecting one of said surfaces to a substantially constant pressure, and piston controlled means for varying the pressure on another of said differential surfaces.

26. An exhaust controlling device for pneumatic tools comprising a plurality of fluid actuated valves each of which has differential pressure receiving surfaces, means for subjecting one of said surfaces on each valve to a substantially constant pressure, and means for varying the pressure on another of said differential surfaces.

27. An exhaust controlling device for pneumatic tools comprising a plurality of relatively movable fluid actuated valves, each of which has differential pressure receiving surfaces, means for subjecting the smaller area of each valve to a substantially constant pressure, and means for alternately subjecting the larger areas of the valves to fluid pressure.

28. An exhaust controlling device for pneumatic tools comprising a plurality of valves each of which has a differential pressure receiving surface, common means for subjecting one of said surfaces on each valve to substantially constant pressure, and means for varying the pressure on the others of said differential surfaces.

29. An exhaust controlling device for pneumatic tools comprising a plurality of relatively movable fluid actuated valves each of which has differential pressure receiving surfaces, common means for subjecting the smaller area of each valve to a substantially constant pressure, and means for alternately subjecting the larger areas of the valves to fluid pressure.

In testimony whereof I affix my signature.

ELMER GEORGE GARTIN.